United States Patent
Tang

(10) Patent No.: US 9,429,445 B2
(45) Date of Patent: Aug. 30, 2016

(54) NAVIGATION SYSTEM WITH COMMUNICATION IDENTIFICATION BASED DESTINATION GUIDANCE MECHANISM AND METHOD OF OPERATION THEREOF

(75) Inventor: Ky Tang, Milpitas, CA (US)

(73) Assignee: Telenav, Inc., Santa Clara, CA (US)

( * ) Notice: Subject to any disclaimer, the term of this patent is extended or adjusted under 35 U.S.C. 154(b) by 1229 days.

(21) Appl. No.: 12/938,364

(22) Filed: Nov. 2, 2010

(65) Prior Publication Data

US 2012/0109514 A1 May 3, 2012

(51) Int. Cl.
*G01C 21/36* (2006.01)

(52) U.S. Cl.
CPC .................. *G01C 21/3611* (2013.01)

(58) Field of Classification Search
CPC ...... G01C 21/00; G01C 21/34; G01C 21/32; G01C 21/30; G01C 21/005; G01C 21/3655; G01C 21/3611
USPC ....... 701/421, 454, 119, 533, 433, 491, 117, 701/420, 438, 410, 408, 431; 715/854; 455/456.2, 556.1, 414.3, 456.5, 456.1; 342/457; 246/1 R; 703/2
See application file for complete search history.

(56) References Cited

U.S. PATENT DOCUMENTS

| | | | |
|---|---|---|---|
| 5,784,059 A | 7/1998 | Morimoto et al. | |
| 5,890,088 A | 3/1999 | Nimura et al. | |
| 6,512,531 B1 * | 1/2003 | Gartland | 715/854 |
| 6,646,570 B1 | 11/2003 | Yamada et al. | |
| 7,292,935 B2 * | 11/2007 | Yoon | G01C 21/3438 340/988 |
| 7,466,992 B1 * | 12/2008 | Fujisaki | 455/556.1 |
| 7,518,533 B2 | 4/2009 | Mafune | |
| 7,764,231 B1 * | 7/2010 | Karr et al. | 342/457 |
| 2001/0009427 A1 * | 7/2001 | Kaneko et al. | 345/854 |
| 2001/0034588 A1 * | 10/2001 | Agrawals et al. | 703/2 |
| 2002/0128772 A1 * | 9/2002 | Polidi | G01C 21/3415 701/438 |
| 2003/0182052 A1 | 9/2003 | DeLorme et al. | |
| 2004/0203860 A1 * | 10/2004 | Fellenstein et al. | 455/456.1 |
| 2004/0249569 A1 * | 12/2004 | Oh | G01C 21/34 701/533 |
| 2005/0137791 A1 * | 6/2005 | Agrawala et al. | 701/209 |
| 2006/0025158 A1 * | 2/2006 | Leblanc et al. | 455/456.2 |
| 2006/0069503 A1 * | 3/2006 | Suomela | G01C 21/3641 701/431 |
| 2006/0080029 A1 * | 4/2006 | Kodani et al. | 701/208 |
| 2006/0184323 A1 * | 8/2006 | Park | 701/211 |
| 2007/0138347 A1 * | 6/2007 | Ehlers | 246/1 R |
| 2007/0168118 A1 * | 7/2007 | Lappe | G01C 21/005 701/408 |
| 2007/0208497 A1 * | 9/2007 | Downs et al. | 701/117 |
| 2007/0208498 A1 * | 9/2007 | Barker et al. | 701/117 |
| 2007/0271328 A1 | 11/2007 | Geelen et al. | |
| 2008/0040036 A1 * | 2/2008 | Peters et al. | 701/213 |
| 2008/0114538 A1 * | 5/2008 | Lindroos | 701/208 |

(Continued)

OTHER PUBLICATIONS

International Search Report for Application No. PCT/US2011/053097 dated Feb. 16, 2012.

*Primary Examiner* — Yuri Kan
(74) *Attorney, Agent, or Firm* — IP Investment Law Group

(57) ABSTRACT

A method of operation of a navigation system includes: identifying a target location with a communication identification; detecting a current location for locating a device; selecting a candidate location based on the candidate location being closer to the current location than the target location where the candidate location is associated with the communication identification of the target location; and generating a travel route to the candidate location for displaying on the device.

20 Claims, 7 Drawing Sheets

(56) References Cited

U.S. PATENT DOCUMENTS

| | | | |
|---|---|---|---|
| 2008/0214166 A1* | 9/2008 | Ramer et al. | 455/414.3 |
| 2008/0248815 A1* | 10/2008 | Busch | 455/456.5 |
| 2008/0262715 A1* | 10/2008 | Geelen | G01C 21/3655 701/533 |
| 2008/0262717 A1 | 10/2008 | Ettinger | |
| 2008/0288165 A1* | 11/2008 | Suomela et al. | 701/201 |
| 2010/0042651 A1* | 2/2010 | Nakamura et al. | 707/104.1 |
| 2011/0160989 A1* | 6/2011 | Uyeki et al. | 701/119 |
| 2012/0109514 A1* | 5/2012 | Tang | 701/421 |

* cited by examiner

NAVIGATION SYSTEM WITH COMMUNICATION IDENTIFICATION BASED DESTINATION GUIDANCE MECHANISM AND METHOD OF OPERATION THEREOF

TECHNICAL FIELD

The present invention relates generally to a navigation system, and more particularly to a system for communication identification based destination guidance mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, guidance to the destination without considering the communication identification for generating the optimal destination has become a paramount concern for the consumer. Guidance to a destination not most optimal for the user by the navigation system decreases the benefit of using the tool.

Thus, a need still remains for a navigation system with communication identification based destination guidance mechanism to generate a route to a destination most optimal to the user. In view of the ever-increasing commercial competitive pressures, along with growing consumer expectations and the diminishing opportunities for meaningful product differentiation in the marketplace, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: identifying a target location with a communication identification; detecting a current location for locating a device; selecting a candidate location based on the candidate location being closer to the current location than the target location where the candidate location is associated with the communication identification of the target location; and generating a travel route to the candidate location for displaying on the device.

The present invention provides a navigation system, including: a location identifier module, coupled to the communication receiver module, for identifying a target location with a communication identification; a current location detector module, coupled to the location identifier module, for detecting a current location for locating a device; a location selector module, coupled to the current location detector module, for selecting a candidate location based on the candidate location being closer to the current location than the target location where the candidate location is associated with the communication identification of the target location; a route generator module, coupled to the location selector module, for generating a travel route to the candidate location for displaying on the device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
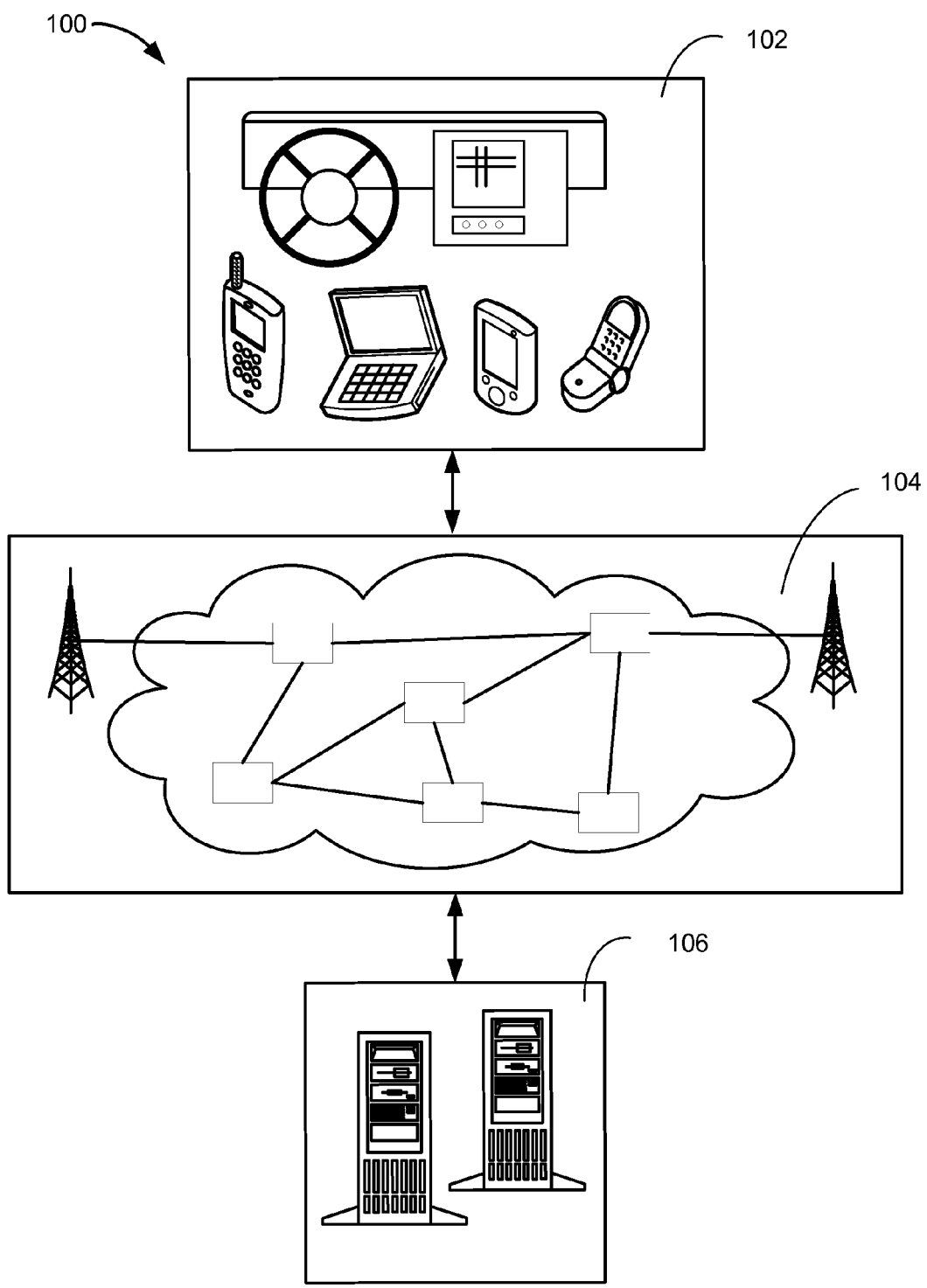
FIG. 1 is a navigation system with communication identification based destination guidance mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with communication identification based destination guidance mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Figure 2:
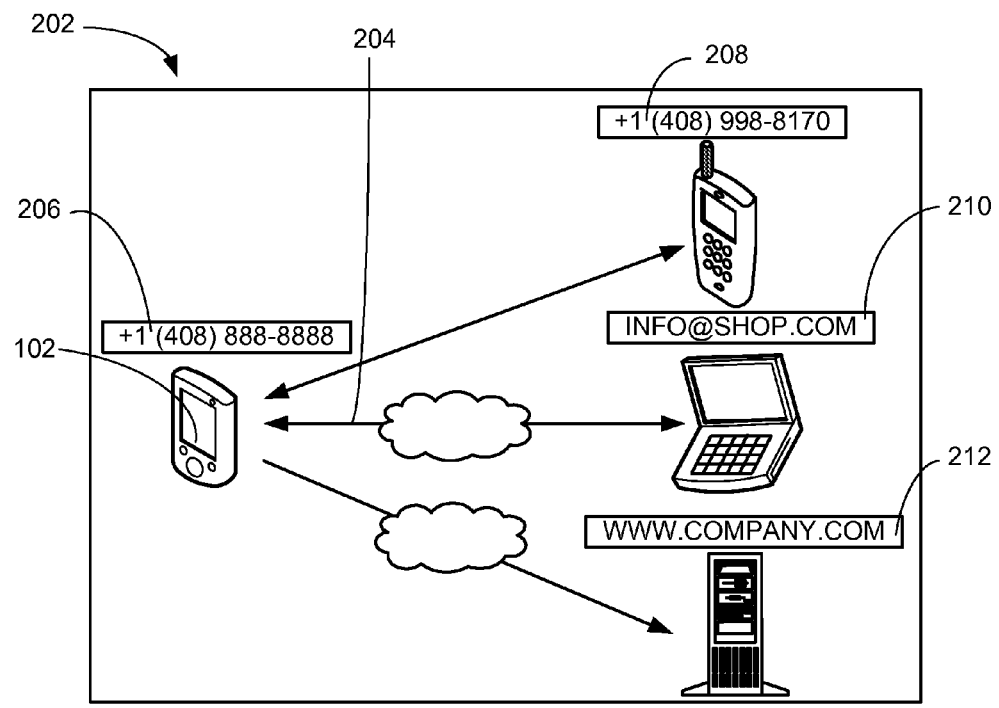
FIG. 2 is an example of conducting a communication using the first device.

Further, the communication path 104 can traverse a number of network topologies and distances. For example, the communication path 104 can include direct connection, personal area network (PAN), local area network (LAN), metropolitan area network (MAN), wide area network (WAN) or any combination thereof Referring now to FIG. 2, therein is shown an example of conducting a communication 202 using the first device 102. The communication 202 is defined as an activity of conveying information. For example, the communication 202 can include making a telephone call, sending an electronic mail 204, or accessing a website.

The electronic mail 204 is defined as a system for sending or receiving messages from one individual to another via telecommunications links between computers or terminals. For example, the first device 102 can send or receive the electronic mail 204 to communicate with another individual utilizing a similar device to the first device 102.

A communication identification 206 is defined as an identification of the party involved in the communication 202. For example, a telephone number 208 can be the communication identification 206 for communicating via a telephone call. The telephone number 208 for the first device 102 can be "+1 (408) 888-8888." The first device 102 can receive a call from the telephone number 208 "+1 (408) 998-8170." For a further example, the communication 202 can occur when the user, the navigation system 100, or a combination thereof accepts or makes the call.

For a different example, an electronic mail address 210 can be the communication identification 206 for communicating via the electronic mail 204. The electronic mail address 210 for sending the electronic mail 204 from the first device 102 can be "john@doe.com." The first device 102 can receive the electronic mail 204 from the electronic mail address 210 "info@shop.com." For a further example, the communication 202 can occur when the user, the navigation system 100, or a combination thereof downloads or sends the electronic mail 204.

For another example, a website address 212 can be the communication identification 206 of a website. The first device 102 can access the website with the website address 212 "www.company.com." For a further example, the communication 202 can occur when the user, the navigation system 100, or a combination thereof accesses the website address 212.

Figure 3:
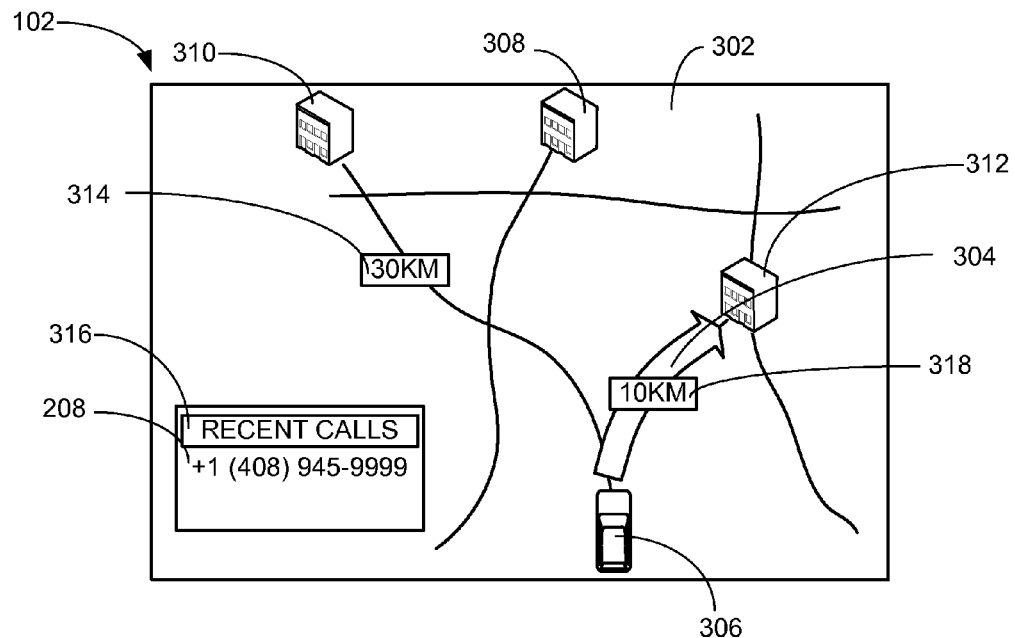
FIG. 3 is a first example of a display of a display interface for the first device.

Referring now to FIG. 3, therein is shown a first example of a display of a display interface 302 for the first device 102. A travel route 304 is defined as a path that the vehicle with the navigation system 100 can take to reach the target destination. The travel route 304 includes a current location 306, a geographic location 308, a target location 310, a candidate location 312, or a combination thereof The current location 306 is defined as a physical location of the vehicle with the navigation system 100 when the communication 202 of FIG. 2 occurred. For example, if the navigation system 100 receives a call from the telephone number 208 "+1 (408) 945-9999" while traversing a highway, the current location 306 can represent the physical location where the navigation system 100 receives the call.

For a further example, the navigation system 100 can update the current location 306 while the communication 202 is still occurring. The physical location where the navigation system 100 made and ended the call can be different. The navigation system 100 can update the current location 306 to be the physical location where the call ended.

The geographic location 308 is defined as the physical location where the travel route 304 can guide the vehicle to reach. For example, the geographic location 308 can represent the address of the physical location, the latitude and longitude coordinates of the physical location, or a combination thereof.

The target location 310 is defined as the target destination associated with the communication identification 206. For example, "+1 (408) 945-9999" can be the communication identification 206 for the restaurant called Sushi Maru™ in Milpitas, Calif. (CA). The target location 310 for the communication identification 206 of "+1 (408) 945-9999" can be Sushi Maru™ in Milpitas, Calif. For a further example, the target location 310 can be represented by the address of the physical location, the latitude and longitude coordinates of the physical location, or a combination thereof.

The candidate location 312 is defined as the destination that is not targeted by the user, the navigation system 100, or a combination thereof but is also associated with the communication identification 206. Continuing with the previous example, the communication identification 206 can be "+1 (408) 945-9999" and the target destination can be Sushi Maru™ in Milpitas, Calif.

The candidate location 312 can be Sushi Maru™ in San Jose, Calif. Although "+1 (408) 945-9999" is not the telephone number 208 for the Sushi Maru™ in San Jose, the Sushi Maru™ in San Jose is associated with "+1 (408) 945-9999," because the restaurant in Milpitas and San Jose are both "Sushi Maru" and are affiliated. For a further example, the candidate location 312 can be represented by the address of the physical location, the latitude and longitude coordinates of the physical location, or a combination thereof.

A target distance 314 is defined as the physical length from the location of the vehicle with the navigation system 100 to the target destination. For example, the target distance 314 between the current location 306 and the target location 310 can be 30 kilometers.

A candidate distance 318 is defined as the physical length from the location of the vehicle with the navigation system 100 to the destination not targeted by the user, the navigation system 100, or a combination thereof. For example, the candidate distance 318 between the current location 306 and the candidate location 312 can be 10 kilometers.

A call log 316 is defined as a record of the communication 202 involving a telephone call. For example, the call log 316 can record recent calls, missed calls, or a combination thereof. For a further example, the call log 316 can record that the navigation system 100 received the telephone number 208 of "+1 (408) 945-9999" from Sushi Maru™ of Milpitas.

The example illustrated in FIG. 3 is as follows. A user of the navigation system 100 will be denoted as "user." The user can enter the telephone number 208 "+1 (408) 945-9999" from the call log 316 for recent calls into the navigation system 100 to generate the travel route 304. The target location 310 can be Sushi Maru™ in Milpitas. The candidate location 312 can be Sushi Maru™ in San Jose.

The target distance 314 from the current location 306 to the target location 310 can be 30 kilometers. The candidate distance 318 from the current location 306 to the candidate location 312 can be 10 kilometers. Because the target distance 314 exceeds the candidate distance, the navigation system 100 can generate the travel route 304 to the candidate location 312 instead of to the target location 310. The details regarding the navigation system 100 generating the travel route 304 will be discussed later.

Figure 4:
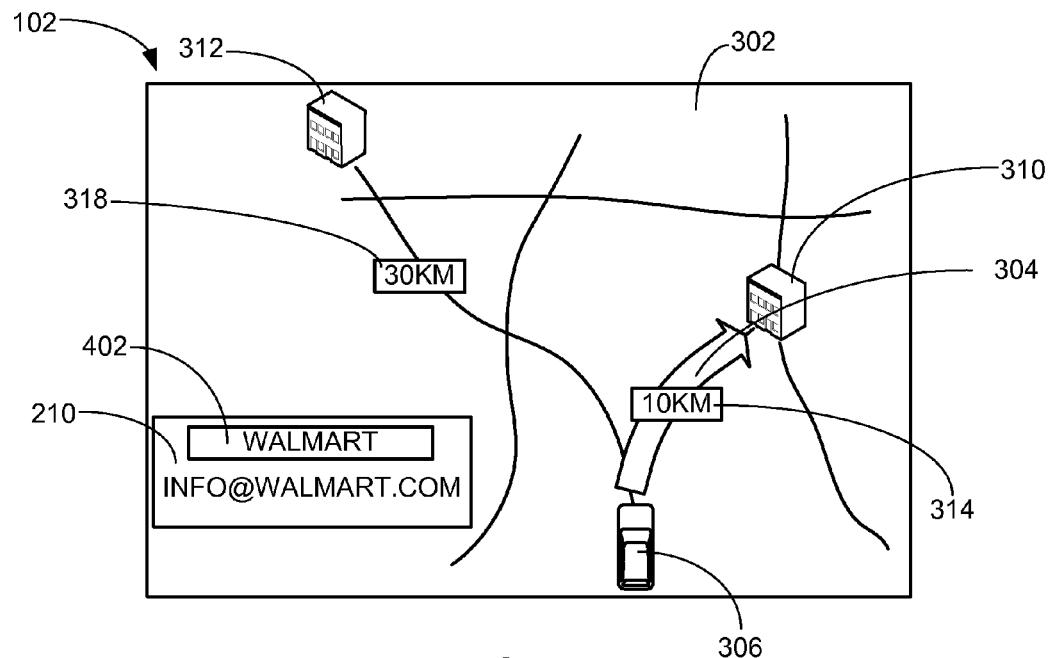
FIG. 4 is a second example of a display of the display interface for the first device.

Referring now to FIG. 4, therein is shown a second example of a display of the display interface 302 for the first device 102. An address book 402 is defined as an electronic storage medium where the communication identification 206, such as the telephone number 208 of FIG. 2, the electronic mail address 210, the website address 212 of FIG. 2, or a combination thereof, is stored. For example, the address book 402 can be stored within the first device 102, the cloud computing, or a combination thereof.

The example illustrated in FIG. 4 is as follows. The user can enter the electronic mail address 210 from the address book 402 into the navigation system 100 to generate the travel route 304. The target location 310 can be a store called Walmart™ in Milpitas. The current location 306 of the vehicle can be Milpitas. The navigation system 100 can consider another Walmart™ in San Jose as the candidate location 312.

The target distance 314 from the current location 306 to the target location 310 can be 10 kilometers. The candidate distance 318 from the current location 306 to the candidate location 312 can be 30 kilometers. Since the target distance 314 is closer than the candidate distance 318, the navigation system 100 can generate the travel route 304 to the target location 310 instead of the candidate location 312. The details regarding the navigation system 100 generating the travel route 304 will be discussed later.

Figure 5:
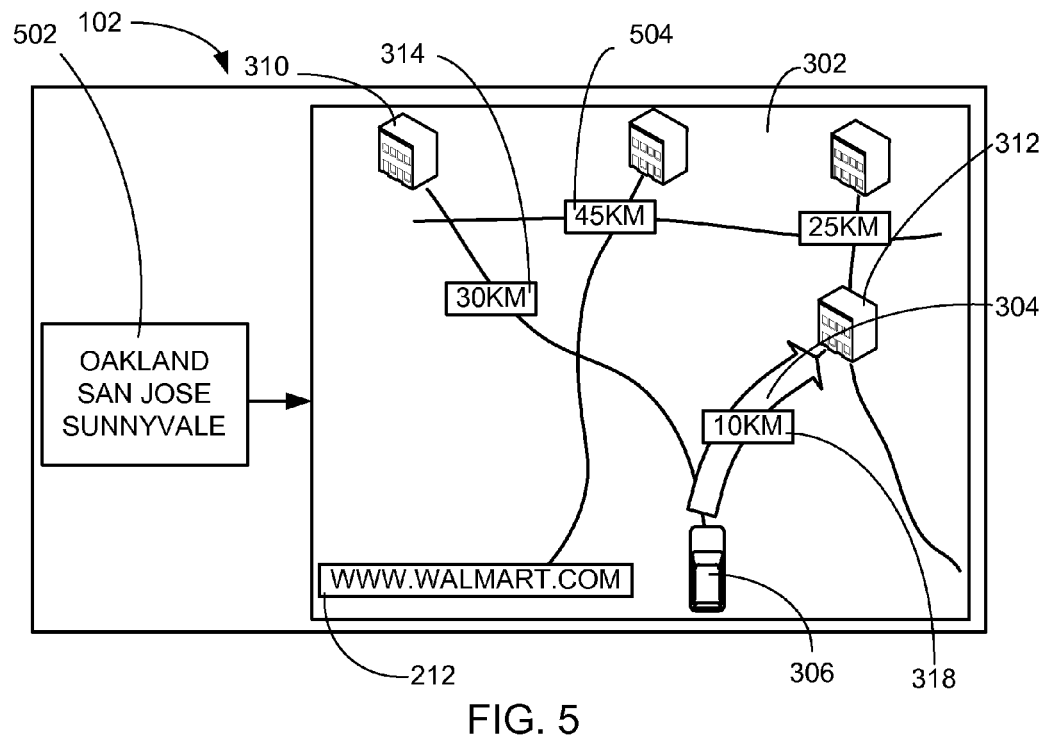
FIG. 5 is a third example of a display of the display interface for the first device.

Referring now to FIG. 5, therein is shown a third example of a display of the display interface 302 for the first device 102. Destination candidates 502 are defined as candidates of the destination associated with the communication identification 206 of FIG. 2 that the navigation system 100 considers for selecting the candidate location 312. For example, the destination candidates 502 for Walmart™ can include not only the Walmart™ in San Jose, but also in Oakland, Calif. and Sunnyvale, Calif.

A travel distance 504 is defined as the physical distance from the location of the vehicle with the navigation system 100 to each of the candidates of the destination. For example, The travel distance 504 for the destination candidates 502 representing Walmart™ in San Jose, Oakland, Sunnyvale can be 45 kilometers, 10 kilometers, and 25 kilometers respectively.

The example illustrated in FIG. 5 is as follows. The user can enter the website address 212 for Walmart™ into the navigation system 100. The destination candidates 502 can include the Walmart™ in Oakland, San Jose, and Sunnyvale. The navigation system 100 can calculate the travel distance 504 from the current location 306 to each of the destination candidates 502.

For example, the navigation system 100 can select one of the destination candidates 502 with the shortest of the travel distance 504 as the candidate location 312. The candidate location 312 can be the Walmart™ in Oakland.

For this example, the target location 310 can be the Walmart™ in Milpitas. The target distance 314 from the current location 306 to the target location 310 can be 30 kilometers. The candidate distance 318 from the current location 306 to the candidate location 312 can be 10 kilometers. Since the target distance 314 exceeds the candidate distance 318, the navigation system 100 can generate the travel route 304 to the candidate location 312 instead of the target location 310. The details regarding the navigation system 100 generating the travel route 304 will be discussed later.

Figure 6:
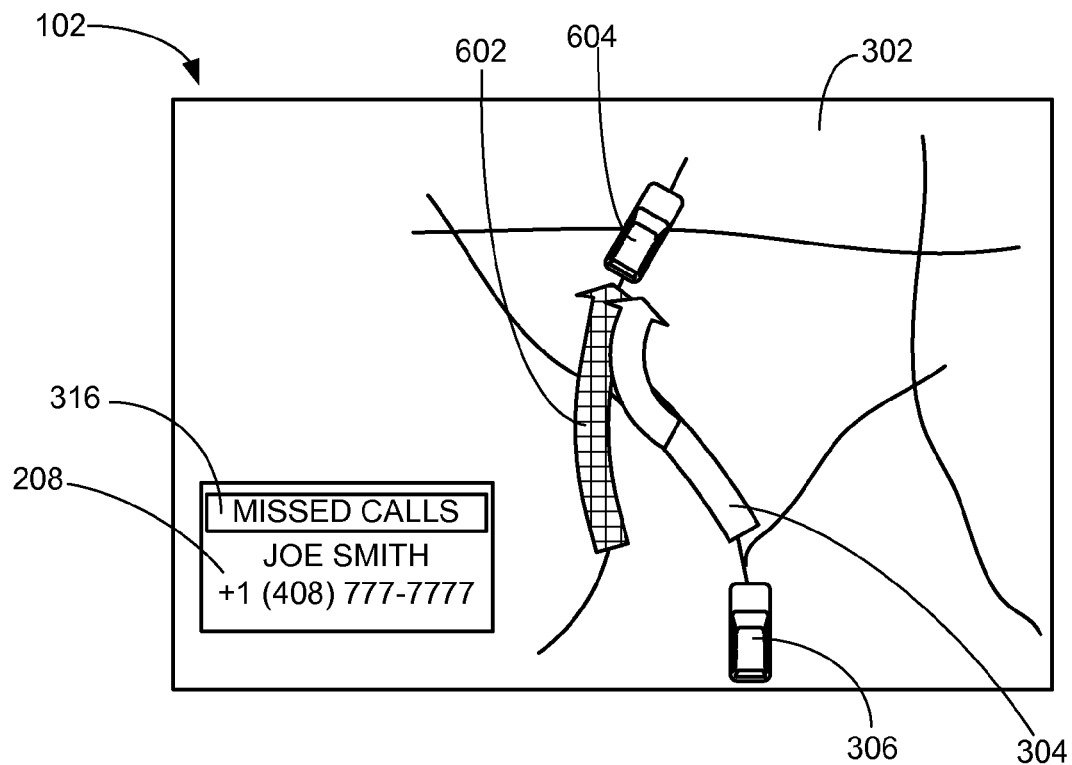
FIG. 6 is a fourth example of a display of the display interface for the first device.

Referring now to FIG. 6, therein is shown a fourth example of a display of the display interface 302 for the first device 102. A partner travel route 602 is defined as a path taken by a party to the communication 202 with the user, the navigation system 100, or a combination thereof. A partner location 604 is defined as the geographic location 308 of FIG. 2 of the party to the communication 202 with the user, the navigation system 100, or a combination thereof. The party to the communication 202 can be stationary or mobile if the party is using a device such as a cellular phone.

The example illustrated in FIG. 6 is as follows. The call log 316 can record a missed call from a friend of the user. The missed call can be the telephone number 208 from a cellular phone. The user can enter the telephone number 208 into the navigation system 100. The navigation system 100 can generate the partner travel route 602 by tracking the changes of the geographic location 308 of FIG. 3 of the partner location 604. Furthermore, the navigation system 100 can generate the travel route 304 from the current location 306 by tracking the partner travel route 602 for the user. The vehicle can rendezvous with the party to the communication 202 by traversing the travel route 304 to reach the partner location 604.

Figure 7:
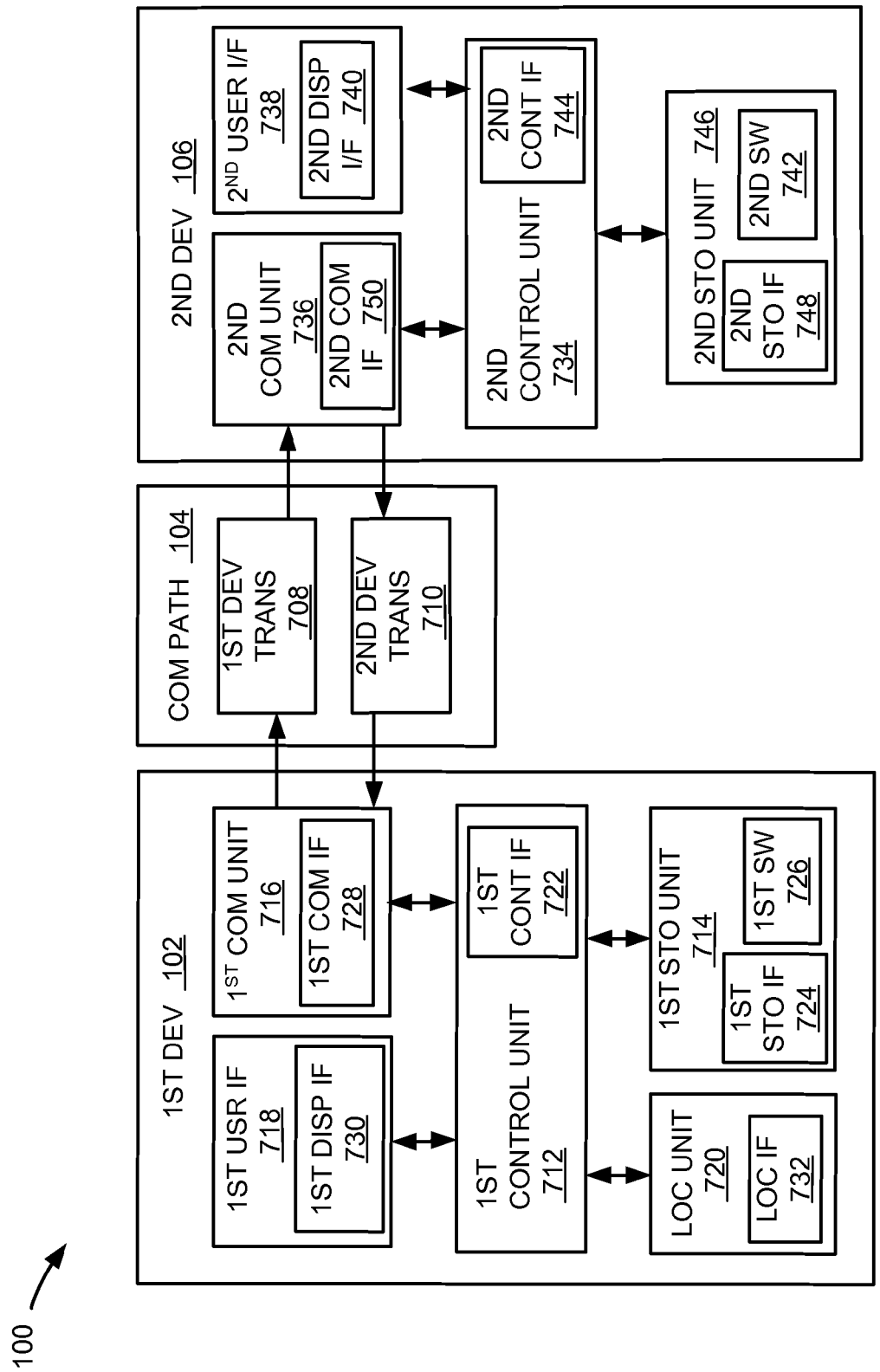
FIG. 7 is an exemplary block diagram of the navigation system.

Referring now to FIG. 7, therein is shown an exemplary block diagram of the navigation system 100. The navigation system 100 can include the first device 102, the communication path 104, and the second device 106. The first device 102 can send information in a first device transmission 708 over the communication path 104 to the second device 106. The second device 106 can send information in a second device transmission 710 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 712, a first storage unit 714, a first communication unit 716, a first user interface 718, and a location unit 720. The first control unit 712 can include a first control interface 722. The first control unit 712 can execute a first software 726 to provide the intelligence of the navigation system 100. The first control unit 712 can be implemented in a number of different manners. For example, the first control unit 712 can be a processor, an embedded processor, a microprocessor, a hardware control logic, a hardware finite state machine (FSM), a digital signal processor (DSP), or a combination thereof. The first control interface 722 can be used for communication between the first control unit 712 and other functional units in the first device 102. The first control interface 722 can also be used for communication that is external to the first device 102.

The first control interface 722 can receive information from the other functional units or from external sources, or can transmit information to the other functional units or to external destinations. The external sources and the external destinations refer to sources and destinations external to the first device 102.

The first control interface 722 can be implemented in different ways and can include different implementations depending on which functional units or external units are being interfaced with the first control interface 722. For example, the first control interface 722 can be implemented with a pressure sensor, an inertial sensor, a microelectromechanical system (MEMS), optical circuitry, waveguides, wireless circuitry, wireline circuitry, or a combination thereof The location unit 720 can generate location information, current heading, and current speed of the first device 102, as examples. The location unit 720 can be implemented in many ways. For example, the location unit 720 can function as at least a part of a global positioning system (GPS), an inertial navigation system, a cellular-tower location system, a pressure location system, or any combination thereof.

The location unit 720 can include a location interface 732. The location interface 732 can be used for communication between the location unit 720 and other functional units in the first device 102. The location interface 732 can also be used for communication that is external to the first device 102.

The location interface 732 can receive information from the other functional units or from external sources, or can transmit information to the other functional units or to external destinations. The external sources and the external destinations refer to sources and destinations external to the first device 102.

The location interface 732 can include different implementations depending on which functional units or external units are being interfaced with the location unit 720. The location interface 732 can be implemented with technologies and techniques similar to the implementation of the first control interface 722.

The first storage unit 714 can store the first software 726. The first storage unit 714 can also store the relevant information, such as advertisements, points of interest (POI), navigation routing entries, or any combination thereof The first storage unit 714 can be a volatile memory, a nonvolatile memory, an internal memory, an external memory, or a combination thereof. For example, the first storage unit 714 can be a nonvolatile storage such as non-volatile random access memory (NVRAM), Flash memory, disk storage, or a volatile storage such as static random access memory (SRAM).

The first storage unit 714 can include a first storage interface 724. The first storage interface 724 can be used for communication between the location unit 720 and other functional units in the first device 102. The first storage interface 724 can also be used for communication that is external to the first device 102.

The first storage interface 724 can receive information from the other functional units or from external sources, or can transmit information to the other functional units or to external destinations. The external sources and the external destinations refer to sources and destinations external to the first device 102.

The first storage interface 724 can include different implementations depending on which functional units or external units are being interfaced with the first storage unit 714. The first storage interface 724 can be implemented with technologies and techniques similar to the implementation of the first control interface 722.

The first communication unit 716 can enable external communication to and from the first device 102. For example, the first communication unit 716 can permit the first device 102 to communicate with the second device 106 of FIG. 1, an attachment, such as a peripheral device or a computer desktop, and the communication path 104.

The first communication unit 716 can also function as a communication hub allowing the first device 102 to function as part of the communication path 104 and not limited to be an end point or terminal unit to the communication path 104. The first communication unit 716 can include active and passive components, such as microelectronics or an antenna, for interaction with the communication path 104.

The first communication unit 716 can include a first communication interface 728. The first communication interface 728 can be used for communication between the first communication unit 716 and other functional units in the first device 102. The first communication interface 728 can receive information from the other functional units or can transmit information to the other functional units.

The first communication interface 728 can include different implementations depending on which functional units are being interfaced with the first communication unit 716. The first communication interface 728 can be implemented with technologies and techniques similar to the implementation of the first control interface 722.

The first user interface 718 allows a user (not shown) to interface and interact with the first device 102. The first user interface 718 can include an input device and an output device. Examples of the input device of the first user interface 718 can include a keypad, a touchpad, soft-keys, a keyboard, a microphone, or any combination thereof to provide data and communication inputs.

The first user interface 718 can include a first display interface 730. The first display interface 730 can include a display, a projector, a video screen, a speaker, or any combination thereof.

The first control unit 712 can operate the first user interface 718 to display information generated by the navigation system 100. The first control unit 712 can also execute the first software 726 for the other functions of the navigation system 100, including receiving location information from the location unit 720. The first control unit 712 can further execute the first software 726 for interaction with the communication path 104 via the first communication unit 716.

The second device 106 can be optimized for implementing the present invention in a multiple device embodiment with the first device 102. The second device 106 can provide the additional or higher performance processing power compared to the first device 102. The second device 106 can include a second control unit 734, a second communication unit 736, and a second user interface 738.

The second user interface 738 allows a user (not shown) to interface and interact with the second device 106. The second user interface 738 can include an input device and an output device. Examples of the input device of the second user interface 738 can include a keypad, a touchpad, soft-keys, a keyboard, a microphone, or any combination thereof to provide data and communication inputs. Examples of the output device of the second user interface 738 can include a second display interface 740. The second display interface 740 can include a display, a projector, a video screen, a speaker, or any combination thereof.

The second control unit 734 can execute a second software 742 to provide the intelligence of the second device 106 of the navigation system 100. The second software 742 can operate in conjunction with the first software 726. The second control unit 734 can provide additional performance compared to the first control unit 712.

The second control unit 734 can operate the second user interface 738 to display information. The second control unit 734 can also execute the second software 742 for the other functions of the navigation system 100, including operating the second communication unit 736 to communicate with the first device 102 over the communication path 104.

The second control unit 734 can be implemented in a number of different manners. For example, the second control unit 734 can be a processor, an embedded processor, a microprocessor, a hardware control logic, a hardware finite state machine (FSM), a digital signal processor (DSP), or a combination thereof.

The second control unit 734 can include a second controller interface 744. The second controller interface 744 can be used for communication between the second control unit 734 and other functional units in the second device 106. The second controller interface 744 can also be used for communication that is external to the second device 106.

The second controller interface 744 can receive information from the other functional units or from external sources, or can transmit information to the other functional units or to external destinations. The external sources and the external destinations refer to sources and destinations external to the second device 106.

The second controller interface 744 can be implemented in different ways and can include different implementations depending on which functional units or external units are being interfaced with the second controller interface 744. For example, the second controller interface 744 can be implemented with a pressure sensor, an inertial sensor, a microelectromechanical system (MEMS), optical circuitry, waveguides, wireless circuitry, wireline circuitry, or a combination thereof.

A second storage unit 746 can store the second software 742. The second storage unit 746 can also store the relevant information, such as advertisements, points of interest (POI), navigation routing entries, or any combination thereof. The second storage unit 746 can be sized to provide the additional storage capacity to supplement the first storage unit 714.

For illustrative purposes, the second storage unit 746 is shown as a single element, although it is understood that the second storage unit 746 can be a distribution of storage elements. Also for illustrative purposes, the navigation system 100 is shown with the second storage unit 746 as a single hierarchy storage system, although it is understood that the navigation system 100 can have the second storage unit 746 in a different configuration. For example, the second storage unit 746 can be formed with different storage technologies forming a memory hierarchal system including different levels of caching, main memory, rotating media, or off-line storage.

The second storage unit 746 can be a volatile memory, a nonvolatile memory, an internal memory, an external memory, or a combination thereof. For example, the second storage unit 746 can be a nonvolatile storage such as non-volatile random access memory (NVRAM), Flash memory, disk storage, or a volatile storage such as static random access memory (SRAM).

The second storage unit 746 can include a second storage interface 748. The second storage interface 748 can be used for communication between the location unit 720 and other functional units in the second device 106. The second storage interface 748 can also be used for communication that is external to the second device 106.

The second storage interface 748 can receive information from the other functional units or from external sources, or can transmit information to the other functional units or to external destinations. The external sources and the external destinations refer to sources and destinations external to the second device 106.

The second storage interface 748 can include different implementations depending on which functional units or external units are being interfaced with the second storage unit 746. The second storage interface 748 can be implemented with technologies and techniques similar to the implementation of the second controller interface 744.

The second communication unit 736 can enable external communication to and from the second device 106. For example, the second communication unit 736 can permit the second device 106 to communicate with the first device 102 over the communication path 104.

The second communication unit 736 can also function as a communication hub allowing the second device 106 to function as part of the communication path 104 and not limited to be an end point or terminal unit to the communication path 104. The second communication unit 736 can include active and passive components, such as microelectronics or an antenna, for interaction with the communication path 104.

The second communication unit 736 can include a second communication interface 750. The second communication interface 750 can be used for communication between the second communication unit 736 and other functional units in the second device 106. The second communication interface 750 can receive information from the other functional units or can transmit information to the other functional units.

The second communication interface 750 can include different implementations depending on which functional units are being interfaced with the second communication unit 736. The second communication interface 750 can be implemented with technologies and techniques similar to the implementation of the second controller interface 744.

The first communication unit 716 can couple with the communication path 104 to send information to the second device 106 in the first device transmission 708. The second device 106 can receive information in the second communication unit 736 from the first device transmission 708 of the communication path 104.

The second communication unit 736 can couple with the communication path 104 to send information to the first device 102 in the second device transmission 710. The first device 102 can receive information in the first communication unit 716 from the second device transmission 710 of the communication path 104. The navigation system 100 can be executed by the first control unit 712, the second control unit 734, or a combination thereof.

For illustrative purposes, the second device 106 is shown with the partition having the second user interface 738, the second storage unit 746, the second control unit 734, and the second communication unit 736, although it is understood that the second device 106 can have a different partition. For example, the second software 742 can be partitioned differently such that some or all of its function can be in the second control unit 734 and the second communication unit 736. Also, the second device 106 can include other functional units not shown in FIG. 7 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 720, although it is understood that the second device 106 can also operate the location unit 720.

Figure 8:
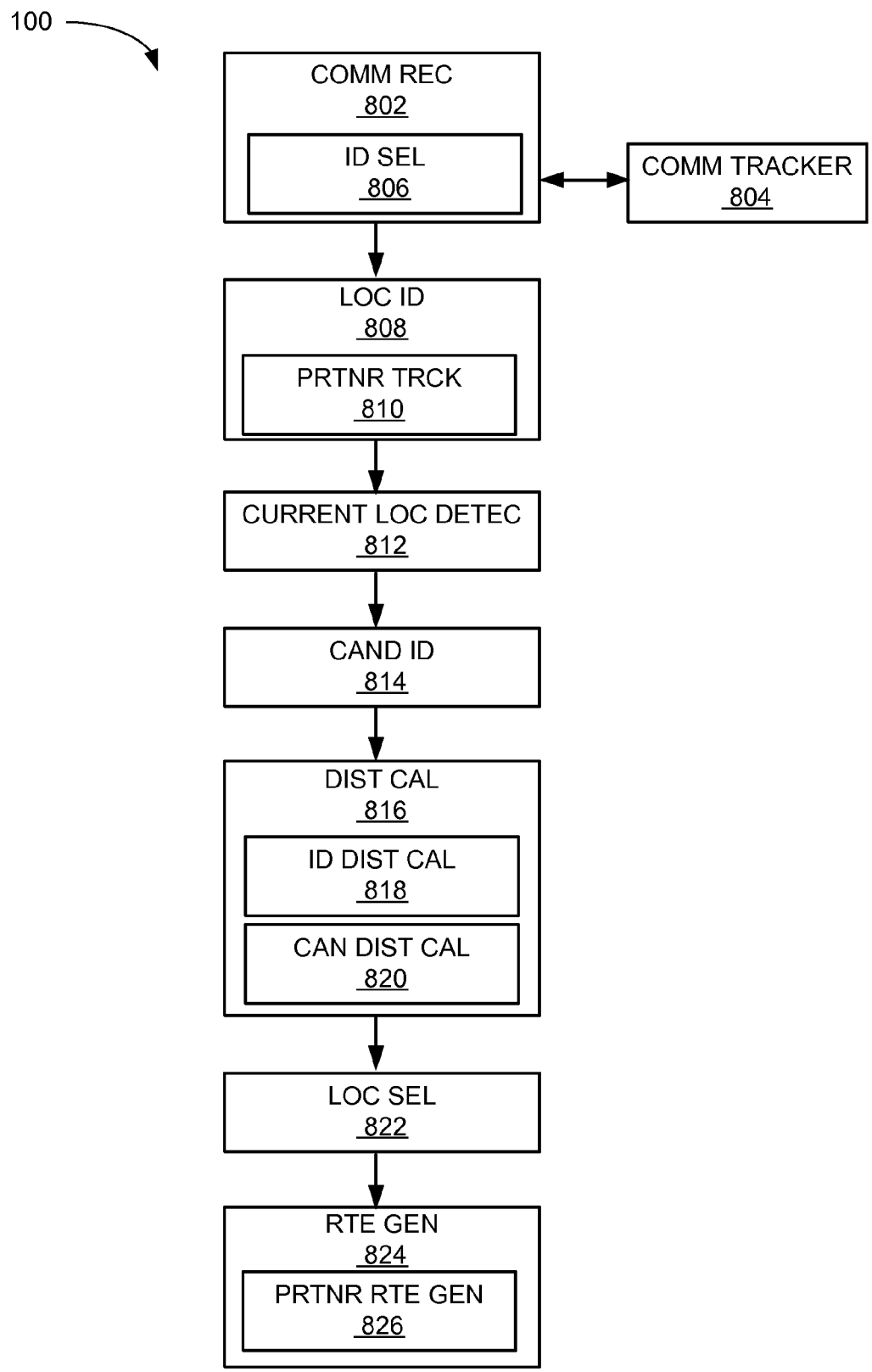
FIG. 8 is a control flow of the navigation system.

Referring now to FIG. 8, therein is shown a control flow of the navigation system 100. The navigation system 100 can include a communication receiver module 802. The communication receiver module 802 receives the identification involved in the communication 202 of FIG. 2. For example, the communication receiver module 802 can receive the communication identification 206 of FIG. 2 based on the communication 202.

The communication receiver module 802 can receive the communication identification 206 in a number of ways. For example, the user can enter the communication identification 206 into the communication receiver module 802 by manually typing in, selecting from a list, speaking a voice command, or a combination thereof the telephone number 208 of FIG. 2, the electronic mail address 210 of FIG. 2, the website address 212 of FIG. 2, or a combination thereof. As a different example, the communication receiver module 802 can receive the telephone number 208 from the telephone call, the electronic mail address 210 from the electronic mail 204 of FIG. 2, the website address 212 from the internet access, or a combination thereof via the first control interface 722 of FIG. 7.

The navigation system 100 can include a communication tracker module 804. The communication tracker module 804 tracks the identification involved in the communication 202. For example, the communication tracker module 804 can track the communication identification 206 based on the communication 202. For a further example, the communication tracker module 804 can generate the call log 316 of FIG. 3, the address book 402 of FIG. 4, or a combination thereof.

The communication tracker module 804 can track the communication identification 206 in a number of ways. For example, the communication tracker module 804 can generate the call log 316 by categorizing the telephone number 208 as the recent calls received by the first device 102 of FIG. 1. Additionally, the communication tracker module 804 can generate the call log 316 by categorizing the telephone number 208 that the user had failed to respond as missed calls. The communication tracker module 804 can store the call log 316 in the first storage unit 714 of FIG. 7, the second storage unit 746 of FIG. 7, or a combination thereof.

For a different example, the communication tracker module 804 can generate the address book 402 by categorizing the address book 402 according to the telephone number 208, the electronic mail address 210, the website address 212 received by the communication tracker module 804. For a more specific example, the address book 402 can categorize the electronic mail address 210 by names alphabetically. Additionally, the address book 402 can categorize the website address 212 accessed by the navigation system 100 by the number of visits to the website.

For illustrative purposes, the navigation system 100 is shown with the communication receiver module 802 receiving the communication identification 206 from the user, the external sources, or a combination thereof, although it is understood that the navigation system 100 can operate the communication receiver module 802 differently. For example, the communication receiver module 802 can select the communication identification 206 from the call log 316, the address book 402, or a combination thereof.

The communication receiver module 802 can select the communication identification 206 in a number of ways. For example, the communication receiver module 802 includes an identification selector module 806. The identification selector module 806 selects the communication identification 206.

The identification selector module 806 can select the communication identification 206 in a number of ways. For example, the identification selector module 806 can select the telephone number 208 from the call log 316, the address book 402, or a combination thereof. For a more specific example, the identification selector module 806 can select "+1 (408) 945-9999" from the call log 316 representing recent calls as illustrated in FIG. 3.

For another example, the user, the navigation system 100, or a combination thereof can enter a name of a person "Joe Smith" in to the communication receiver module 802. The identification selector module 806 can select the telephone number 208 for "Joe Smith" from the address book 402 that matches the entry to the communication receiver module 802.

For a different example, the identification selector module 806 can select the electronic mail address 210 from the electronic mail 204, the address book 402, or a combination thereof. For a specific example, the identification selector module 806 can select the electronic mail address 210 from the address book 402 similarly to the identification selector module 806 selecting the telephone number 208 from the address book 402.

For a different example, the identification selector module 806 can select the website address 212. For a more specific example, the identification selector module 806 can select the website address 212 from the address book 402 similarly to the identification selector module 806 selecting the telephone number 208 from the address book 402.

The navigation system 100 can include a location identifier module 808. The location identifier module 808 identifies the physical location associated with the communication identification 206. For example, the location identifier module 808 can identify the target location 310 of FIG. 3 associated with the communication identification 206.

The location identifier module 808 can identify the target location 310 in a number of ways. For example, the location identifier module 808 can search the public and private directory based on the communication identification 206 via the first control interface 722 to identify the target location 310.

For a further example, the communication identification 206 can be "+1 (408) 945-9999." The location identifier module 808 can search the telephone number 208 at public rating websites, such as Yelp.com™, to identify that the target location 310 associated with the telephone number 208 is "Sushi Maru" in Milpitas.

For another example, the location identifier module 808 can search the telephone number 208 in the address book 402. The address book 402 can include the physical address associated with the telephone number 208.

For illustrative purposes, the navigation system 100 is shown with the location identifier module 808 identifying the target location 310, although it is understood that the navigation system 100 can operate the location identifier module 808 differently. For example, the location identifier module 808 can identify the partner location 604 of FIG. 6 associated with the communication identification 206.

The location identifier module 808 can identify the partner location 604 in a number of ways. The location identifier module 808 includes a partner tracker module 810. The partner tracker module 810 tracks the geographic location 308 of FIG. 3 of the party that the user is communicating with. For example, the partner tracker module 810 can track the partner location 604.

As illustrated in FIG. 6, the party involved in the communication 202 with the user can be using a cellular phone equipped with GPS. The cellular phone can be equipped with a GPS tracking service to track the geographic location 308 for that cellular phone. The partner tracker module 810 can identify the partner location 604 associated with the communication identification 206 for that party by utilizing the GPS tracking service.

Additionally, using the GPS tracking service, the partner tracker module 810 can track the partner location 604 associated with the communication 202. The party involved in the communication 202 can change the geographic location 308, because the party can be driving a vehicle. The partner tracker module 810 can track the changes of the partner location 604 by utilizing the GPS tracking service to detect the changes in the partner location 604 of the party.

The navigation system 100 can include a current location detector module 812. The current location detector module 812 detects the physical location of the user when the user is making or made the communication 202. For example, the current location detector module 812 can detect the current location 306 of FIG. 3 associated with when the communication 202 occurred for locating the first device 102 of FIG. 1.

The current location detector module 812 can detect the current location 306 in a number of ways. For example, the current location detector module 812 can detect when the communication 202 occurred via the first communication unit 716 of FIG. 7. When the first communication unit 716 is activated to transmit the communication 202, the location unit 720 of FIG. 7 can detect the current location 306 of the user. More specifically, the location unit 720 can detect the current location 306 when the communication 202 started via the first communication unit 716. Furthermore, the location unit 720 can update the current location 306 when the communication 202 ended by detecting that the first communication unit 716 ended the communication 202.

The navigation system 100 can include a candidate identifier module 814. The candidate identifier module 814 identifies whether there are additional locations associated with the communication identification 206 other than the target location 310. For example, the candidate identifier module 814 can identify one or more of the destination candidates 502 of FIG. 5 associated with the communication identification 206.

The candidate identifier module 814 can identify the destination candidates 502 in a number of ways. For example, the candidate identifier module 814 can identify one or more of the destination candidates 502 associated with the telephone number 208. For a more specific example, the communication identification 206 can be "+1 (408) 945-9999" for Sushi Maru™ in Milpitas. The candidate identifier module 814 can search a public directory, such as Yelp.com™, and identify that there is another Sushi Maru™ in San Jose. The candidate identifier module 814 can identify Sushi Maru™ in San Jose as one of the destination candidates 502 associated with the telephone number 208 "+1 (408) 945-9999."

For a different example, the candidate identifier module 814 can identify one or more of the destination candidates 502 associated with the electronic mail address 210, the website address 212, or a combination thereof. For a more specific example, the communication identification 206 can be "info@walmart.com" for Walmart™. Based on the electronic mail address 210, the candidate identifier module 814 can search the website address 212 "www.walmart.com" and identify multiple store locations for Walmart™. The candidate identifier module 814 can identify the multiple store locations for Walmart™ as the destination candidates 502.

The navigation system 100 can include a distance calculator module 816. The distance calculator module 816 calculates the physical distance from one location to another. For example, the distance calculator module 816 can calculate the target distance 314 from the current location 306 to the target location 310.

The distance calculator module 816 can calculate the target distance 314 in a number of ways. For example, the distance calculator module 816 includes an identified distance calculator module 818. The identified distance calculator module 818 calculates the target distance 314 from the current location 306 to the target location 310. For a more specific example, the identified distance calculator module 818 can calculate the target distance 314 by calculating the physical distance from the GPS coordinates of the current location 306 to the GPS coordinates of the target location 310. The identified distance calculator module 818 can also calculate the target distance 314 based on the physical length of the route between the current location 306 and the target location 310.

For another example, the distance calculator module 816 can include a candidate distance calculator module 820. The candidate distance calculator module 820 calculates the target distance 314 from the current location 306 to each of the destination candidates 502. The candidate distance calculator module 820 also calculates the target distance 314 from the current location 306 to the candidate location 312.

For a more specific example, as illustrated in FIG. 5, the destination candidates 502 for Walmart™ can be Oakland, San Jose, and Sunnyvale. The candidate distance calculator module 820 can calculate the travel distance 504 of FIG. 5 by calculating the physical distance from the GPS coordinates of the current location 306 to the GPS coordinates for each of the destination candidates 502 or calculating the physical distance of the route between the current location 306 and each of the destination candidates 502. The candidate distance calculator module 820 can calculate the candidate distance 318 for the candidate location 312 similarly.

The navigation system 100 can include a location selector module 822. The location selector module 822 selects the destination where the user will reach at the end of the travel. For example, the location selector module 822 can select the candidate location 312 based on the target distance 314 closer to the current location 306 than the target location 310 where the candidate location 312 is also associated with the communication identification 206.

The location selector module 822 can select in a number of ways. For example, the location selector module 822 can select one of the destination candidates 502 as the candidate location 312 based on the travel distance 504 closest to the current location 306. For a specific example, as illustrated in FIG. 5, the location selector module 822 can select the Walmart™ in Oakland as the candidate location 312, because it is the closest from the current location 306. Subsequently, the travel distance 504 to reach the Walmart™ in Oakland will be the candidate distance 318.

As a different example, the location selector module 822 can select the candidate location 312 over the target location 310 when the target distance 314 exceeds the candidate distance 318 otherwise the target location 310 is selected. As illustrated in FIG. 3, the location selector module 822 can select the candidate location 312 representing Sushi Maru™ in San Jose, because the candidate location 312 is closer than the target location 310 representing Sushi Maru™ in Milpitas from the current location 306.

The navigation system 100 can include a route generator module 824. The route generator module 824 generates the path to the final destination for the user. For example, the route generator module 824 can generate the travel route 304 to the candidate location 312 for displaying on the first device 102.

The route generator module 824 can generate the travel route 304 in a number of ways. For example, the route generator module 824 can generate the travel route 304 to the target location 310 when the target location 310 is closer than the candidate location 312 from the current location 306. In contrast, if the candidate location 312 is closer, the route generator module 824 can generate the travel route 304 to the candidate location 312. For another example, the route generator module 824 can generate the travel route 304 to the partner location similarly to the route generator module 824 generating the travel route 304 to the target location 310.

The route generator module 824 can include a partner route generator module 826. The partner route generator module 826 generates the path that the party to the communication 202 had taken by tracking the changes of the geographic location 308 of that party. For example, the partner route generator module 826 can generate the partner travel route 602 of FIG. 6 based on the partner location 604 being non-stationary.

For a specific example, the partner route generator module 826 can track the partner location 604 using the GPS tracking service while the communication 202 between the user and the party is occurring. The partner route generator module 826 can track each changes of the geographic location 308 of the party to generate the partner travel route 602. Additionally, the partner route generator module 826 can track the partner location 604 even after the communication 202 between the user and the party had ended by utilizing the GPS tracking services to track the party's cellular phone. The duration of tracking the changes of the geographic location 308 of the partner location 604 can be predetermined by a set time frame or indefinitely.

For illustrative purposes, the navigation system 100 is shown with the route generator module 824 generating the travel route 304 to the candidate location 312, although it is understood that the navigation system 100 can operate the route generator module 824 differently. For example, the route generator module 824 can generate the travel route 304 based on tracking the partner travel route 602 for rendezvousing at the partner location 604.

For a specific example, the route generator module 824 can generate the travel route 304 by patterning the travel route 304 based on the partner travel route 602. As illustrated in FIG. 6, some portion of the travel route 304 may not overlap with the partner travel route 602. However, some portion of the travel route 304 can overlap with the partner travel route 602. The route generator module 824 can generate the travel route 304 that will traverse along the partner travel route 602 until the user can rendezvous with the party at the partner location 604.

The physical transformation from displaying the travel route 304 result in movement in the physical world, such as people using the first device 102, the vehicle, or a combination thereof, based on the operation of the navigation system 100. As the movement in the physical world occurs, the movement itself creates additional information that is converted back to the destination candidates 502 and the candidate location 312 for the continued operation of the navigation system 100 and to continue the movement in the physical world.

The first software 726 of FIG. 7 of the first device 102 of FIG. 7 can include the navigation system 100. For example, the first software 726 can include the communication receiver module 802, the communication tracker module 804, the location identifier module 808, and the current location detector module 812. The first software 726 can also include the candidate identifier module 814, the distance calculator module 816, the location selector module 822, and the route generator module 824.

The first control unit 712 of FIG. 7 can execute the first software 726 for the communication receiver module 802 to receive the communication identification 206. The first control unit 712 can execute the first software 726 for the communication tracker module 804 to generate the call log 316, the address book 402, or a combination thereof. The first control unit 712 can execute the first software 726 for the location identifier module 808 to identify the target location 310. The first control unit 712 can execute the first software 726 for the current location detector module 812 to detect the current location 306.

The first control unit 712 can execute the first software 726 for the candidate identifier module 814 to identify the destination candidates 502. The first control unit 712 can execute the first software 726 for the distance calculator module 816 to calculate the target distance 314. The first control unit 712 can execute the first software 726 for the location selector module 822 to select the target location 310 or the candidate location 312.

The first control unit 712 can execute the first software 726 for the route generator module 824 to generate the travel route 304. The first control unit 712 can execute the first display interface 730 of FIG. 7 to display the travel route 304.

The second software 742 of FIG. 7 of the second device 106 of FIG. 7 can include the navigation system 100. For example, the second software 742 can include the communication receiver module 802, the communication tracker module 804, the location identifier module 808, and the current location detector module 812. The second software 742 can also include the candidate identifier module 814, the distance calculator module 816, the location selector module 822, and the route generator module 824.

The second control unit 734 of FIG. 7 can execute the second software 742 for the communication receiver module 802 to receive the communication identification 206. The second control unit 734 can execute the second software 742 for the communication tracker module 804 to generate the call log 316, the address book 402, or a combination thereof. The second control unit 734 can execute the second software 742 for the location identifier module 808 to identify the target location 310. The second control unit 734 can execute the second software 742 for the current location detector module 812 to detect the current location 306.

The second control unit 734 can execute the second software 742 for the candidate identifier module 814 to identify the destination candidates 502. The second control unit 734 can execute the second software 742 for the distance calculator module 816 to calculate the target distance 314. The second control unit 734 can execute the second software 742 for the location selector module 822 to select the target location 310 or the candidate location 312.

The second control unit 734 can execute the second software 742 for the route generator module 824 to generate the travel route 304. The second control unit 734 can execute the second display interface 740 of FIG. 7 for displaying the travel route 304.

The navigation system 100 can be partitioned between the first software 726 and the second software 742. For example, the second software 742 can include the location identifier module 808, the current location detector module 812, the candidate identifier module 814, the distance calculator module 816, the location selector module 822, and the route generator module 824. The second control unit 734 can execute modules partitioned on the second software 742 as previously described.

The first software 726 can include the communication receiver module 802 and the communication tracker module 804. Based on the size of the first storage unit 714, the first software 726 can include additional modules of the navigation system 100. The first control unit 712 can execute the modules partitioned on the first software 726 as previously described.

The first user interface 718 of FIG. 7 can receive an entry by the user for the communication identification 206. The first control unit 712 can operate the first communication unit 716 to send the communication identification 206 to the second device 106. The first control unit 712 can operate the first software 726 to operate the location unit 720.

The second communication unit 736 of FIG. 7 can send the travel route 304 to the first device 102 through the communication path 104 of FIG. 7. The travel route 304 can be displayed on the first display interface 730 and the second device 106.

It has been discovered that the present invention provides the navigation system 100 for providing a safe operation of the navigation system 100 and other user interface system within a vehicle. By generating the travel route 304 to the candidate location 312 closer to the current location 306 instead of the target location 310, the navigation system 100 can decrease the exposure of harm for operating the vehicle. Additionally, by allowing the user to only enter the communication identification 206 for generating the travel route 304 to the geographic location 308 that is most optimal for the user can aid the user of safer operation of the vehicle.

The navigation system 100 describes the module functions or order as an example. The modules can be partitioned differently. For example, the communication receiver module 802 and the communication tracker module 804 can be combined. Each of the modules can operate individually and independently of the other modules.

Furthermore, data generated in one module can be used by another module without being directly coupled to each other. The distance calculator module 816 can receive the current location 306 from the current location detector module 812.

Figure 9:
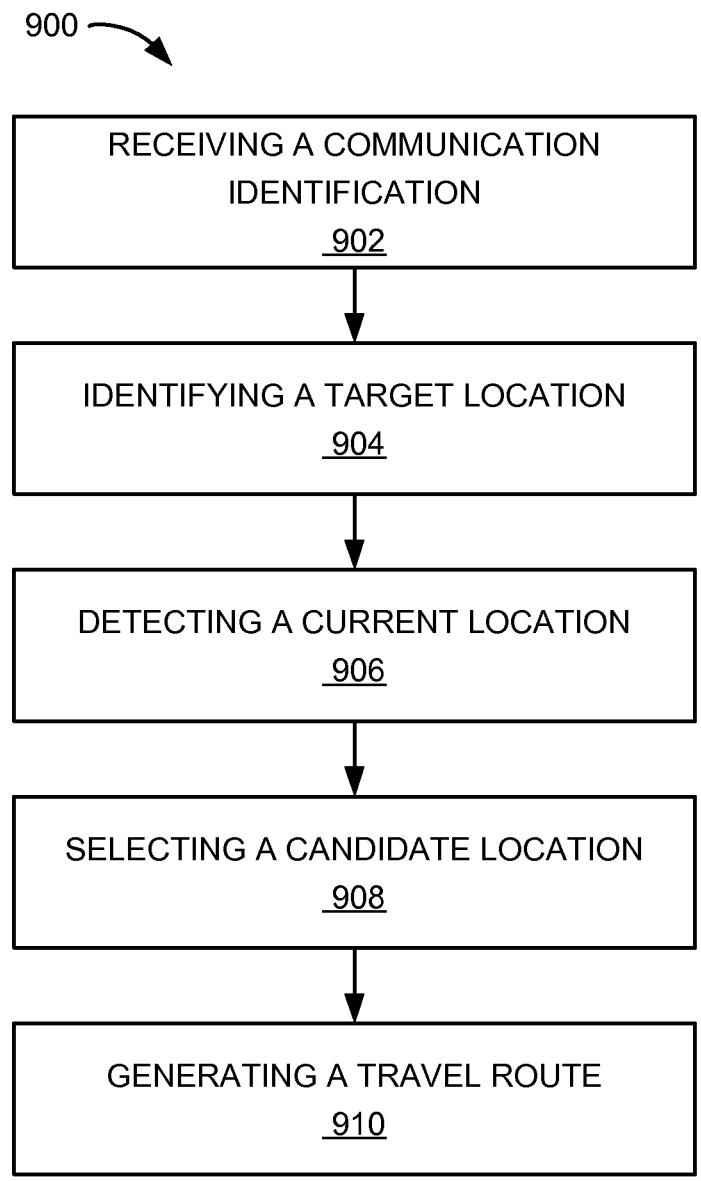
FIG. 9 is a flow chart of a method of operation of the navigation system in a further embodiment of the present invention.

Referring now to FIG. 9, therein is shown a flow chart of a method 900 of operation of the navigation system 100 in a further embodiment of the present invention. The method 900 includes: receiving a communication identification based on a communication in a block 902; identifying a target location associated with the communication identification in a block 904; detecting a current location associated with when the communication occurred for locating a device in a block 906; selecting a candidate location based on the candidate location being closer to the current location than the target location where the candidate location is also associated with the communication identification in a block 908; and generating a travel route to the candidate location for displaying on the device in a block 910.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   identifying a target location with a communication identification;
   detecting a current location with a control unit for locating a device;
   selecting a candidate location based on the candidate location being closer to the current location than the target location where the candidate location is associated with the communication identification of the target location; and
   generating a travel route to the candidate location for displaying on the device.

2. The method as claimed in claim 1 further comprising:
   tracking a partner location for identifying a geographic location associated with the communication identification;
   generating a partner travel route based on the partner location being non-stationary; and
   wherein:
   generating the travel route includes generating the travel route based on tracking the partner travel route for rendezvousing at the partner location.

3. The method as claimed in claim 1 wherein selecting the candidate location includes:
   calculating a target distance from the current location to the target location;
   calculating a candidate distance from the current location to the candidate location; and
   selecting the candidate location over the target location when the target distance exceeds the candidate distance otherwise the target location is selected.

4. The method as claimed in claim 1 wherein generating the travel route includes generating the travel route to the target location when the target location is closer than the candidate location from the current location.

5. The method as claimed in claim 1 wherein selecting the candidate location includes:
   identifying one or more destination candidates associated with the communication identification;
   calculating a travel distance from the current location to each of the destination candidates; and
   selecting one of the destination candidates as the candidate location based on the travel distance closest to the current location.

6. A method of operation of a navigation system comprising:
   identifying a target location with a communication identification;
   detecting a current location with a control unit for locating a device;
   calculating a target distance from the current location to the target location;

calculating a candidate distance from the current location to the candidate location where the candidate location is associated with the communication identification of the target location;

selecting the candidate location over the target location based on the target distance exceeding the candidate distance otherwise the target location is selected; and generating a travel route to the candidate location for displaying on the device.

7. The method as claimed in claim 6 further comprising:
generating a call log, an address book, or a combination thereof;
selecting a telephone number from the call log, the address book, or a combination thereof; and
wherein selecting the candidate location includes:
identifying one or more destination candidates associated with the telephone number;
calculating a travel distance from the current location to each of the destination candidates; and
selecting one of the destination candidates as the candidate location based on the travel distance closest to the current location.

8. The method as claimed in claim 6 further comprising:
selecting an electronic mail address from an electronic mail, an address book, or a combination thereof; and
wherein selecting the candidate location includes:
identifying one or more destination candidates associated with the electronic mail address;
calculating a travel distance from the current location to each of the destination candidates; and
selecting one of the destination candidates as the candidate location based on the travel distance closest to the current location.

9. The method as claimed in claim 6 further comprising:
selecting a website address; and
wherein selecting the candidate location includes:
identifying one or more destination candidates associated with the website address,
calculating a travel distance from the current location to each of the destination candidates, and
selecting one of the destination candidates as the candidate location based on the travel distance closest to the current location.

10. The method as claimed in claim 6 wherein:
identifying the target location includes identifying a partner location associated with the communication identification; and
generating the travel route includes generating the travel route to the partner location.

11. A navigation system comprising:
a control unit for:
identifying a target location with a communication identification;
detecting a current location for locating a device;
selecting a candidate location based on the candidate location being closer to the current location than the target location where the candidate location is associated with the communication identification of the target location;
generating a travel route to the candidate location; and
a communication unit, coupled to the control unit, for sending the travel route for displaying on the device.

12. The system as claimed in claim 11 wherein the control unit is for:
tracking a partner location for identifying a geographic location associated with the communication identification;

generating a partner travel route based on the partner location being not stationary; and
generating the travel route based on tracking the partner travel route for rendezvousing at the partner location.

13. The system as claimed in claim 11 wherein the control unit is for:
calculating a target distance from the current location to the target location;
calculating a candidate distance from the current location to the candidate location; and
selecting the candidate location over the target location when the target distance exceeds the candidate distance otherwise the target location is selected.

14. The system as claimed in claim 11 wherein the control unit is for generating the travel route to the target location when the target location is closer than the candidate location from the current location.

15. The system as claimed in claim 11 wherein the control unit is for:
identifying one or more destination candidates associated with the communication identification;
calculating a travel distance from the current location to each of the destination candidates; and
selecting one of the destination candidates as the candidate location based on the travel distance closest to the current location.

16. The system as claimed in claim 11 wherein the control unit is for:
calculating a target distance from the current location to the target location;
calculating the candidate distance from the current location to the candidate location where the candidate location is associated with the communication identification of the target location; and
selecting the candidate location over the target location based on the target distance exceeding the candidate distance otherwise the target location is selected.

17. The system as claimed in claim 16 wherein the control unit is for:
generating a call log, an address book, or a combination thereof;
selecting a telephone number from the call log, the address book, or a combination thereof;
identifying one or more destination candidates associated with the telephone number;
calculating a travel distance from the current location to each of the destination candidates; and
selecting one of the destination candidates as the candidate location based on the travel distance closest to the current location.

18. The system as claimed in claim 16 wherein the control unit is for:
selecting an electronic mail address from an electronic mail, an address book, or a combination thereof;
identifying one or more destination candidates associated with the electronic mail address;
calculating a travel distance from the current location to each of the destination candidates; and
selecting one of the destination candidates as the candidate location based on the travel distance closest to the current location.

19. The system as claimed in claim 16 wherein the control unit is for:
selecting a website address;
identifying one or more destination candidates associated with the website address;

calculating a travel distance from the current location to each of the destination candidates; and selecting one of the destination candidates as the candidate location based on the travel distance closest to the current location.

20. The system as claimed in claim 16 wherein the control unit is for:

identifying a partner location associated with the communication identification; and generating the travel route to the partner location.

* * * * *